(12) United States Patent
Timpe

(10) Patent No.: US 7,121,406 B2
(45) Date of Patent: Oct. 17, 2006

(54) DEVICE FOR STORING A PLURALITY OF PROTECTIVE CONTAINERS

(76) Inventor: Rainer Timpe, Redener Weg 8, Pattensen 30982 (DE)

( * ) Notice: Subject to any disclaimer, the term of this patent is extended or adjusted under 35 U.S.C. 154(b) by 152 days.

(21) Appl. No.: 10/763,387

(22) Filed: Jan. 26, 2004

(65) Prior Publication Data

US 2004/0217025 A1 Nov. 4, 2004

(30) Foreign Application Priority Data

Jan. 24, 2003 (DE) ................. 103 02 959

(51) Int. Cl.
*B65D 85/57* (2006.01)
*A47B 81/06* (2006.01)
(52) U.S. Cl. ................. 206/308.1; 312/9.54; 312/9.55; 312/9.58
(58) Field of Classification Search ............ 206/308.1, 206/309; 211/40; 312/9.53–9.56, 9.58–9.59, 312/9.61
See application file for complete search history.

(56) References Cited

U.S. PATENT DOCUMENTS

| 1,341,412 A | * | 5/1920 | Brown | 312/9.59 |
|---|---|---|---|---|
| 1,358,833 A | * | 11/1920 | Dolman | 312/9.58 |
| 2,499,220 A | * | 2/1950 | Hinsdale | 211/40 |
| 2,499,221 A | * | 2/1950 | Hinsdale | 211/40 |
| 2,763,524 A | * | 9/1956 | Beers | 312/9.61 |
| 3,316,039 A | * | 4/1967 | Drobny | 312/9.58 |
| 3,489,475 A | * | 1/1970 | Boyce et al. | 312/9.61 |
| 4,722,034 A | * | 1/1988 | Ackeret | 206/308.1 |
| 4,859,007 A | * | 8/1989 | Schapker | 312/9.54 |
| 5,515,979 A | * | 5/1996 | Salvail | 211/40 |
| 5,547,078 A | * | 8/1996 | Iida | 206/308.1 |
| 5,690,221 A | * | 11/1997 | Yeh | 206/308.1 |

* cited by examiner

*Primary Examiner*—Bryon P. Gehman
(74) *Attorney, Agent, or Firm*—Crowell & Moring LLP

(57) ABSTRACT

A device (1) for storing a plurality of protective cases (2) on a holding element (11). The protective cases (2) have an insertion opening (5) on one end face (4) for inserting flat information carriers (3), particularly CDs or DVDs, and a second face (16) resting at least partially on the holding element (11). To simplify the storage of the protective cases (2) and the removal or insertion of the information carriers (3), the holding element (11) has a tab (15) in an edge area, which engages with a recess (17) in the second face (16) of the protective cases (2), such that a corresponding protective case (2) can be pivoted from a storage position (9) into a removal position (10). In the removal position (10) the information carrier (3) can be removed from the protective case (2) without the necessity of detaching the protective case (2) from the holding element (11).

27 Claims, 2 Drawing Sheets

DEVICE FOR STORING A PLURALITY OF PROTECTIVE CONTAINERS

BACKGROUND OF THE INVENTION

The invention relates to a device for storing a plurality of protective cases on a holding element. The protective cases each have an insertion opening disposed on one face for the insertion of flat information carriers, particularly CDs or DVDs. With a second face they rest at least partially on the holding element.

A protective case of the above-described type is already known from published German patent application no. DE 101 17 159 A1. This protective case has a bottom plate and a cover plate, which are interconnected by sidewalls on three sides. The bottom plate and the cover plate form a U-shaped holding space for a flat information carrier, e.g., for a CD or a DVD, accessible via an insertion opening that is arranged on one face. To facilitate the insertion of the information carrier, the bottom plate has a circular segment-shaped recess on the side of the insertion opening. A U-shaped engagement opening for removing the information carrier is provided in the cover plate. It opens towards the side of the insertion opening and ends approximately in the center of the information carrier. The protective case can be constructed as one piece or several pieces and is made, for example, of a clear plastic. It is also possible to arrange one or more booklets or inserts in the protective case, which can likewise be inserted into and removed from the protective case via the insertion opening.

A device for holding a plurality of these protective cases is known in practice through prior use and thus forms part of the prior art. In this device, several protective cases are arranged next to one another on a holding element that is configured as a CD rack, for example. To remove an information carrier from one of the protective cases, the case has to be taken down from the holding element with one hand and the information carrier pulled out of the protective case with the other hand. Thereafter, the empty protective case is placed back onto the holding element or is temporarily stored elsewhere.

The drawback is that both hands are required to remove the information carrier from the protective case, which substantially limits the ease of operation. The protective case, which is now empty after the information carrier has been removed, subsequently has to be reinserted into the gap on the holding element created between the other protective cases by the removal of the one protective case. This insertion requires a substantial amount of dexterity. When the removed information carrier is to be reinserted into the empty protective case, the respective empty protective case located on the holding element next to the other protective cases must be found and taken down from the holding element before the information carrier can be inserted and the protective case can be returned to the holding element. This requires time and effort, which has proven to be a substantial drawback.

SUMMARY OF THE INVENTION

The object of the invention is to provide an improved device the storage of protective cases for flat information carriers.

Another object of the invention is to provide a device for storage of protective cases for flat information carriers that substantially simplifies the storage of the protective cases.

A further object of the invention is to provide a device for storage of protective cases for flat information carriers that facilitates easy removal and/or insertion of the information carriers.

These and other objects are achieved in accordance with the present invention by providing a device for storing a plurality of protective cases on a holding element, wherein the protective cases each have an insertion opening on one end face for inserting flat information carriers and a second face which rests at least partially on the holding element, and wherein, in an edge area, the holding element has a tab which engages in a recess in said second face of each protective case such that a respective protective case can be pivoted from a storage position into a removal position in which an information carrier can be removed from, or inserted into, said respective protective case.

Advantageous further refinements of the invention are also described hereinafter.

The invention thus provides a device in which the holding element has a tab in an edge area that engages with a recess made in the second face of the protective case, such that a corresponding protective case can be pivoted from a storage position into a removal position in which a respective information carrier can be removed from the protective case or inserted into the protective case. This makes it possible to remove the information carrier with one hand and thus substantially increases the ease of operation. This ensures reliable and rapid handling of the protective cases and the information carriers, so that the overall handling effort is substantially reduced. By pivoting the protective case from the storage position into the removal position, the accessibility of the insertion opening of the protective case is significantly improved and the removal of the information carrier is therefore simplified. Even in the removal position, the protective case remains on the holding element. The gap that would be created between the protective cases by the removal of a protective case according to the prior art is filled in the removal position by at least a portion of the protective case. As a result, the insertion of the protective case into this gap, which requires substantial dexterity, is eliminated. After the information carrier has been removed, the protective case can remain in the removal position or it can be pivoted back into its storage position on the holding element. If the protective case remains in the removal position it is known to be empty and can therefore be immediately identified as empty for the reinsertion of the information carrier.

It has proven to be advantageous if the respective protective case can be removed from the holding element in the storage position. This makes it possible to detach a protective case together with the information carrier stored therein from the holding element, so that it can also be used independently of the device, e.g., to transport the information carrier. For this purpose, the protective case is lifted, for example, and the tab is thereby detached from the recess.

It has proven to be particularly practical if the corresponding protective case can be detached from the holding element in the removal position. This eliminates the need to pivot a protective case in the removal position back into the storage position before it can be detached from the holding element.

A further advantageous refinement of the invention is achieved if the recess has a conical shape and is provided with at least one stop face, which in the removal position contacts a stop face of the tab. The stop faces of the recess and the tab limit the pivoting motion of the protective case from the storage position to the removal position and define the precise position of the protective case in the removal position.

It has proven to be particularly advantageous if the recess has an access opening in the second face of the protective case which is adapted to the shape of the tab, such that the dimensions of the access opening are slightly larger than the dimensions of the tab. This adaptation of the access opening of the recess to the shape of the tab ensures, on the one hand, that the protective case is securely connected with the holding element when it is pivoted from the storage position to the removal position. On the other hand, it enables the protective case to be detached from the holding element.

Another particularly promising further refinement of the present invention is provided if a center of mass of the protective cases relative to a pivoting point of the protective cases is arranged in such a way that an automatic pivoting of the protective cases from the removal position or from the storage position is excluded. This arrangement of the center of mass makes it possible to prevent an accidental, e.g., gravity-dependent, pivoting of the protective case, either from the storage position into the removal position or from the removal position into the storage position.

Another particularly advantageous modification of the device is obtained if the protective cases automatically pivot into the removal position or into the storage position when the center of mass is shifted over an intermediate position between the storage position and the removal position. The pivoting motion of the protective case is initially triggered manually and is supported manually until it reaches or exceeds an intermediate position. Once this intermediate position is reached or exceeded, this manual support is no longer necessary because the protective case falls into the respective end position as a function of gravity. The functional sequence, i.e., the pivoting of the protective cases, is supported by a dynamic shift of the center of mass.

It has proven to be particularly advantageous if the stop face of the tab is substantially perpendicular to the holding element. This ensures, on the one hand, that the protective case can be placed onto the holding element and the tab can consequently be inserted into the access opening of the recess without canting. On the other hand, the perpendicular arrangement of the stop face effectively prevents the protective case from slipping off the holding element in the removal position.

It is especially easy if the tab has a rectangular cross section and extends across almost the entire width of the holding element. This is a particularly simply way to provide a tab that prevents the protective case from slipping off the holding element in the removal position and to enable the tab to be inserted into the access opening of the recess. The tab can be formed integrally with the holding element, e.g., as a strip, or it can be fixed to the face of the holding element.

It is particularly practical if the recess is configured as a through opening. This enables the protective cases to be shifted on the holding element without having to be detached from the holding element. It also makes it possible to store protective cases of different widths on one and the same holding element.

Another particularly advantageous further refinement of the present device is obtained if the holding element is provided with a rear wall and/or sidewalls and/or a cover element. This creates a module that encloses the device at least partially and thereby protects it from dirt and dust. The sidewalls laterally delimit the holding element, laterally support the protective cases arranged on the holding element and thereby prevent the protective cases from tipping or falling over.

It has proven to be particularly advantageous if at least one additional holding element can be attached to the [first] holding element using at least one connecting device. Depending on the required or desired width, two or more holding element can thus be interconnected. These interconnected holding elements can of course also have two sidewalls and/or a rear wall and/or a cover element, or two modules, each having two sidewalls and/or a rear wall and/or a cover element, can be attached to one another.

In yet another advantageous further refinement of the device, the connecting device is arranged in such a way that the holding element can be expanded both horizontally and vertically. As a result, the holding element, or the module consisting of a holding element, sidewalls, a rear wall and a cover element, can be readily expanded in width or height. This modular expandability provides enormous flexibility.

Another particularly advantageous embodiment of the device is created if the connecting device has at least one groove-shaped recess in each of the holding elements to be connected and a connecting element that is arranged at least partially in the respective recess. Inserting the connecting element into the two recesses of the holding elements that are to be connected makes it possible to connect these holding elements very effectively. In practice, the holding elements are pushed onto the connecting element. The connecting element can, for instance, also be attached to a wall or some other surface. This provides the option of wall-mounting the entire device in a simple manner.

It is advantageous if the connecting element is fixed in the groove-shaped recess so as to be detachable. This effectively prevents the holding element from becoming accidentally detached from the connecting element and yet allows the interconnected holding elements to be detached from one another. Fixation can be effected, for example, by one or several screws, which can also be used to attach the connecting element to a wall or a surface.

Particularly advantageous is a modification in which the connecting element is arranged in the groove-shaped recess in a positive locking manner. As a result, there is no need for additional fixation elements such as screws or the like to connect the holding elements. Furthermore, no assembly tools are required for this type of connection.

In a particularly practical embodiment, this positive locking connection is obtained by giving the groove-shaped recess a dovetail profile. The connecting element to be inserted into the recess is suitably adapted to this dovetail profile. The dovetail profile provides an effective positive locking connection.

Another particularly promising further refinement of the present device is obtained if the insertion opening of the protective cases can be covered by a pivotable flap when they are in their storage position. This prevents dust from getting into the insertion openings of the protective cases and collecting on the information carriers stored therein. The pivotable configuration of the flap ensures that the protective cases can be pivoted from the storage position to the removal position. During this pivoting of the protective cases the flap is briefly lifted from the other protective cases. Once the pivoted case has reached the removal position, however, the flap falls back onto the other protective cases. In addition, a front edge of the flap can be used for labeling and identifying the protective cases.

It is advantageous if the pivotable flap is integrated into the rear wall in the manner of a hinge. To provide effective dust protection, the distance between the flap and the insertion openings of the protective cases should be kept as small as possible.

A further particularly promising embodiment of the present device is created if the rear wall has a tongue element and if a face of the protective case associated with the rear wall has a correspondingly shaped groove that rests at least partially on this tongue element. This prevents the protective cases from tipping over. The tongue and groove system is configured in such a way that in the storage position the protective cases are supported on the upper edge of the tongue. The weight of the protective cases exerts a force that results in a kind of suspension of the protective cases.

Another likewise advantageous modification of the device is achieved if the holding element has a catch that prevents the pivoting of the protective cases from the storage position to the removal position. This makes it possible to limit access to the protective cases and thus the information carriers. For example, the catch can be arranged in a bore made in one of the sidewalls above the pivotable flap. This catch prevents pivoting of the flap and thus also pivoting of the protective cases into the removal position. If the catch is configured as a lock, the device or individual components can be locked.

It is particularly advantageous if the holding element and/or the protective cases are at least partially made of a transparent and/or transmissive material. As a result, the labels of the protective cases are visible at any time. Furthermore, the appearance of the device is positively influenced by the selection of this material.

A further particularly advantageous embodiment is obtained if the holding device is illuminated. This makes it possible to readily identify any labels associated with the protective cases or the information carriers, e.g., any booklets or inserts placed in the protective case, even if the ambient light is diffuse. This illumination can also be used to vary the visual impression of the device, e.g., by using colored light or different degrees of brightness.

It has proven to be particularly advantageous if the illumination includes at least one light source that is integrated into the cover element. Suitable light sources are cold light emitting diodes, particularly high-performance diodes, which can be integrated well in the cover element because of their size. The cover element is configured in such a way that the introduced light is deflected due to light reflection in such a way that it radiates down as a sheet of light along the front edge of the cover element. This provides good illumination of labels, booklets or inserts. The power for the diodes is supplied by electric lines, which are disposed, for example, in grooves or recesses in the cover element or in the rear wall.

To make it easier to find a specific information carrier and thus a specific protective case, the visible face of the protective cases arranged on the holding element can be configured in such a way that several of the faces of the protective cases arranged next to one another produce an overall image. This visual recognition effect makes it possible to find the individual information carriers or protective cases more rapidly. The faces can produce either an overall image or several individual images. For example, if the information carriers are music CDs, the faces of the protective cases in which classical CDs are stored can be identified, e.g., by a violin, those in which jazz CDs are stored by a saxophone, etc. Collections with individual interpreters can be identified by a logo or by the interpreter's initials. Showing the initials horizontally across several protective cases is particularly advantageous, especially for legibility. The images can be represented, for example, by graphic effects, light-dark effects or color effects. Placing a decorative foil sticker on the face of a protective case is particularly suitable. This decorative foil sticker could be purchased together with the device as an accessory, or separately, and could be designed and printed, for example, using corresponding software. The individual protective cases could subsequently also be labeled with text using a self-adhesive transparent foil.

BRIEF DESCRIPTION OF THE DRAWINGS

The invention allows various embodiments. To illustrate its basic principle, one of these embodiments is depicted in the drawing and will now be described in greater detail with reference to the figures in which.

DETAILED DESCRIPTION OF PREFERRED EMBODIMENTS

Figure 1:
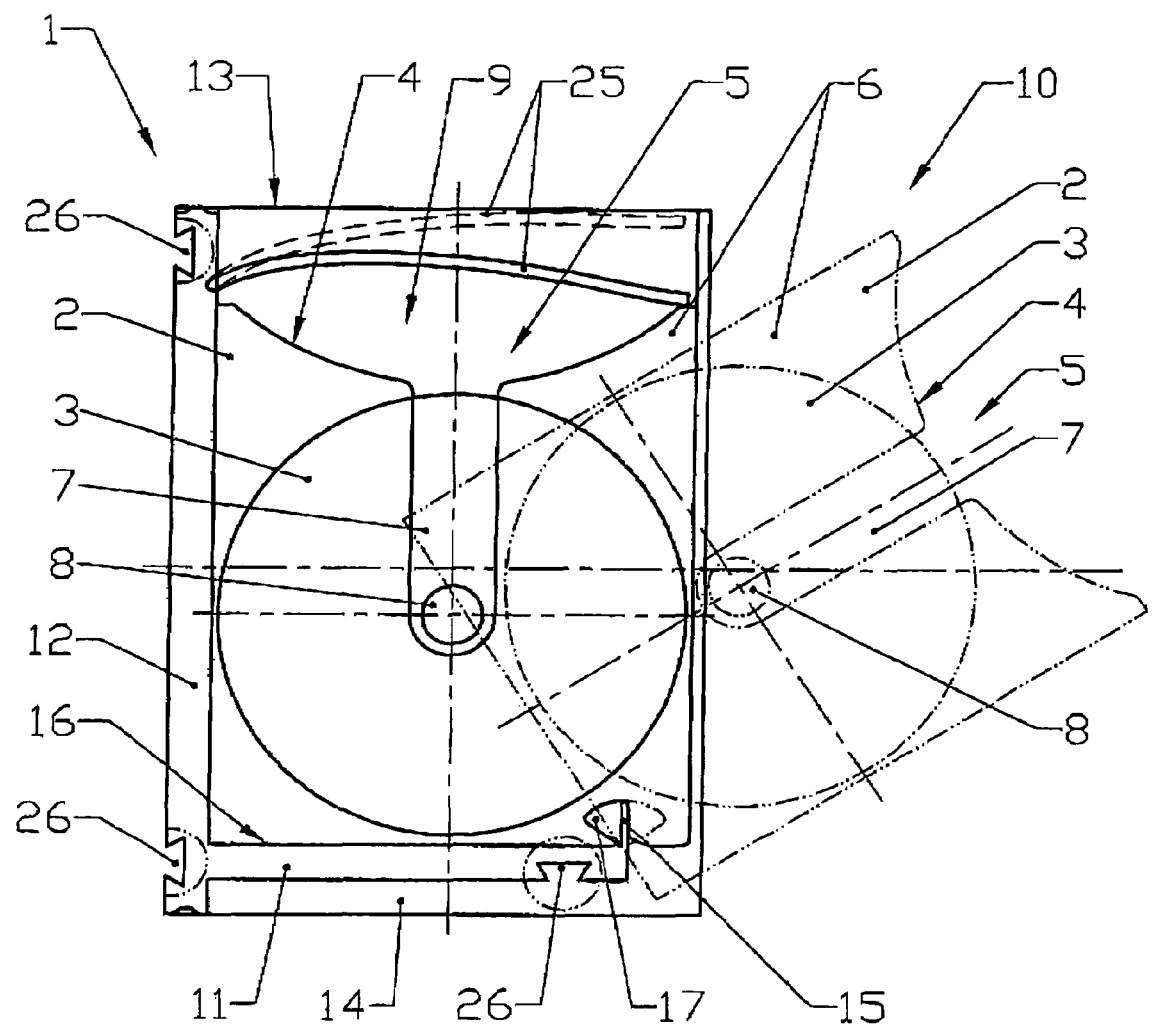
FIG. 1 is a schematic of a device 1 for receiving a plurality of protective cases 2 for flat information carriers 3.

FIG. 1 is a schematic of a device 1 for receiving a plurality of protective cases 2 for flat information carriers 3. The information carriers 3 can be inserted into the protective cases 2 and removed from the protective cases 2 via an insertion opening 5 arranged in a face 4. A cover plate 6 of the protective cases 2 has a U-shaped engagement opening 7. This engagement opening 7 facilitates the engagement with the circular opening 8 in the center of the information carriers 3 and thereby the removal of the information carriers 3 from the protective cases 2. In addition to the information carriers 3, the protective cases 2 each hold an insert and/or one or more booklets.

FIG. 1 further shows a protective case 2 in a storage position 9, represented by solid lines, and a protective case 2 in a removal position 10, represented by broken lines. In the storage position 9 the protective case 2 rests at least partially on a holding element 11. The holding element 11 has a rear wall 12, a cover element 13 and sidewalls 14 of which only one is depicted in the drawing. The holding element 11 further has a tab 15 in an edge area, which engages with a recess 17 made in a second face 16 of the protective case 2.

Figure 2:
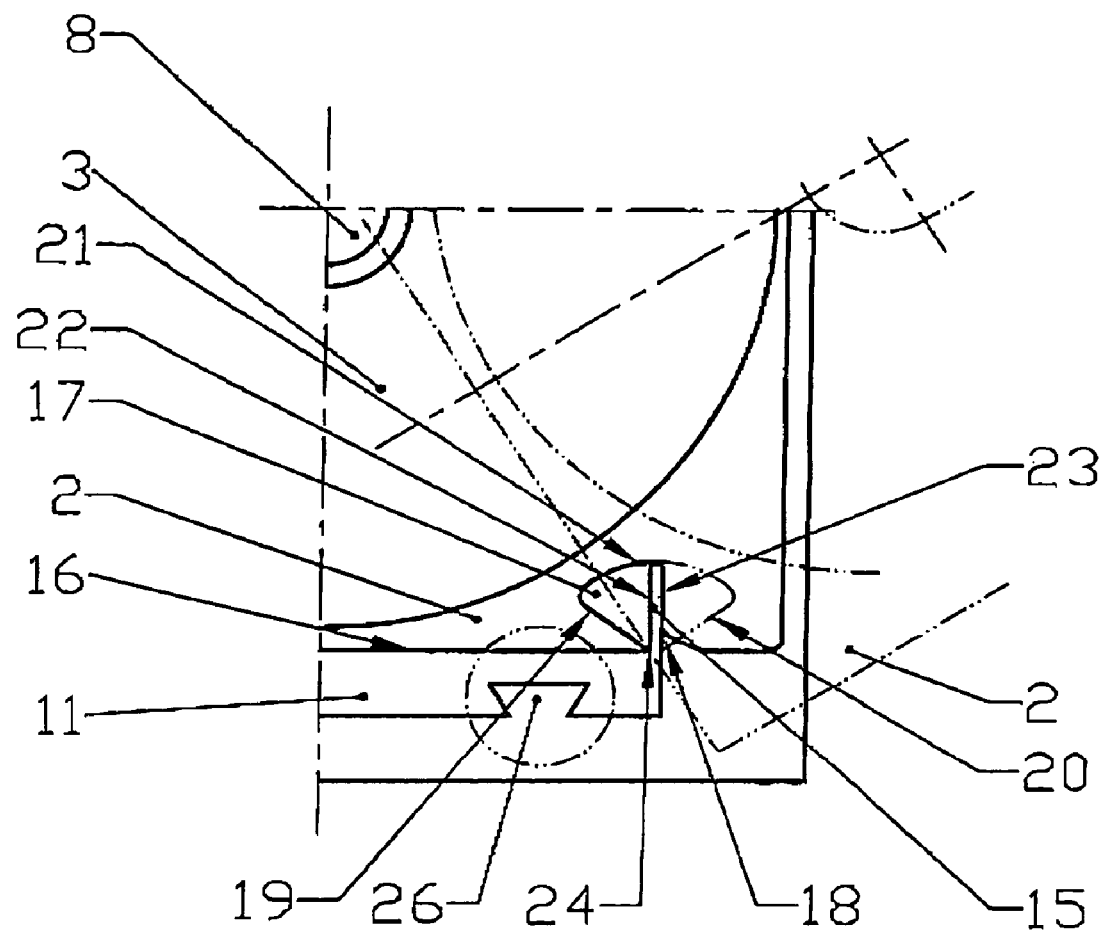
FIG. 2 is an enlarged detail of the tab 15 arranged in the recess 17 of the protective case 2.

As a complement thereto, FIG. 2 shows an enlarged detail of the tab 15 arranged in the recess 17 of the protective case 2. The recess 17 widens conically from an access opening 18 and is bounded by a first and a second stop face 19, 20 and a circular segment-shaped connecting surface 21 joining the stop faces 19, 20. The junction area between the stop faces 19, 20 to the face 16 of the protective case 2 is rounded. The tab 15 also has a first and a second stop face 22, 23. In the storage position 9 the second stop face 20 of the recess contacts the second stop face 23 of the tab 15, and the connecting surface 21 rests on the tab 15.

To remove the information carrier 3 from the protective case 2, it is manually transferred from the storage position 9 to the removal position 10. In this process, the protective case 2 pivots about a pivoting point 24 arranged in the junction area between the first stop face 19 of the recess 17 and the face 16 of the protective case 2, i.e., in the area of the access opening 18 of the recess 17. The protective case 2 executes a pivoting motion until the first stop face 19 of the recess 17 contacts the first stop face 22 of the tab. The removal position 10 of the protective case 2 is reached when the stop face 19 contacts the stop face 22. The information carrier 3 can now be readily removed from the protective case 2 because the insertion opening 5 and the engagement opening 7 of the protective case 2 are better accessible. During the pivoting of the protective case 2, the contact point of the protective case 2 or the recess 17 on the tab 15 shifts along the circular segment-shaped connecting surface 21.

In the storage position 9 the insertion opening 5 of the protective case 2 is sealed by a pivotable flap 25 that prevents dust from getting into the protective case 2 and thus collecting on the information carrier 3. The pivotable flap 25 is arranged in the rear wall 12 in the manner of a hinge and in the position indicated by the solid lines rests at least partially on the protective cases 2. During the pivoting of a protective case 2, the flap 25 is moved into the position indicated by the broken lines. Once the removal position 10 of the protective case 2 has been reached, it falls back onto the protective cases 2, i.e., into the position indicated by the solid lines.

The device 1 further has a plurality of dovetail-shaped groove-like recesses 26, which can also be configured as through openings. Connecting elements can be inserted into these groove-like recesses 26 to connect two holding elements 11 with one another. This makes it possible to expand the device 1 in a modular fashion, both horizontally and vertically. It also enables the entire device 1 to be mounted on a wall. The groove-like recesses 26 do not necessarily have to be dovetail-shaped, however. The groove-like recesses 26 can also be semicircular, for example, or have some other geometric shape. The groove-like recesses 26 can be shaped so as to form an undercut by which the connecting elements are fixed inside the groove-like recesses 26 in a positive locking manner.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A device for storing a plurality of protective cases on a holding element, wherein the protective cases each have an insertion opening on one end face for inserting flat information carriers and a second face which rests at least partially on the holding element, wherein, in an edge area, the holding element has a tab which engages in a recess in each said second face of each protective case such that a respective protective case can be pivoted from a storage position into a removal position in which an information carrier can be removed from, or inserted into, said respective protective case, wherein each protective case can be detached from the holding element in the storage position, wherein each protective case can be detached from the holding element in the removal position, and wherein the recess has a first stop face, which in the removal position contacts a first stop face of the tab, and the recess has a second stop face, which in the storage position contacts a second stop face of the tab.

2. A device according to claim 1, wherein the information carriers are CDs or DVDs.

3. A device according to claim 1, wherein each recess is conical.

4. A device according to claim 3, wherein the first and second stop faces of the tab are substantially perpendicular to the holding element.

5. A device according to claim 1, wherein each recess has an access opening in the second face of each protective case, which is adapted to a shape of the tab, such that the dimensions of the access opening are slightly larger than the dimensions of the tab.

6. A device according to claim 1, wherein a center of mass of each protective case is arranged relative to a pivoting point of each respective protective case such that an automatic pivoting of each protective case from the removal position or from the storage position is excluded.

7. A device according to claim 1, wherein a center of mass of each protective case relative to a pivoting point of each respective protective case is arranged such that each protective case automatically pivots into the removal position or the storage position once the center of mass is shifted over an intermediate position between the storage position and the removal position.

8. A device according to claim 1, wherein the tab has a rectangular cross section and extends almost entirely across the width of the holding element.

9. A device according to claim 1, wherein each recess is a through opening.

10. A device according to claim 1, wherein the holding element has a rear wall.

11. A device according to claim 10, wherein the rear wall has a tongue element, and a face of the protective case is associated with the rear wall and has a correspondingly shaped groove that rests at least partially on said tongue element.

12. A device according to claim 1, wherein the holding element has sidewalls.

13. A device according to claim 1, wherein the holding element has a cover member.

14. A device according to claim 1, wherein the holding element has a rear wall, sidewalls and a cover member.

15. A device according to claim 1, wherein at least one additional holding element can be attached to the holding element using at least one connecting device.

16. A device according to claim 15, wherein the at least one connecting device is arranged in such a way that the holding element can be expanded both horizontally and vertically.

17. A device according to claim 15, wherein the at least one connecting device has at least one groove-shaped recess each in the holding elements to be connected and a connecting element arranged at least in sections inside each respective recess.

18. A device according to claim 17, wherein the connecting element is detachably fixed inside the at least one groove-shaped recess.

19. A device according to claim 17, wherein the connecting element is arranged in the at least one groove-shaped recess in a positive locking manner.

20. A device according to claim 17, wherein the at least one groove-shaped recess has a dovetail profile.

21. A device according to claim 1, wherein further comprising a pivotable flap for covering the insertion opening of each protective case in the storage position.

22. A device according to claim 21, wherein the pivotable flap is hinged to a rear wall of the holding element.

23. A device according to claim 22, wherein the rear wall has a tongue element, and a face of the protective case associated with the rear wall has a correspondingly shaped groove that rests at least partially on said tongue element.

24. A device according to claim 1, wherein the holding element has a catch, which prevents the pivoting of the protective cases from the storage position into the removal position.

25. A device according to claim 1, wherein the holding element is or the protective cases are at least partially made of a transparent material.

26. A device according to claim 1, wherein the holding element is provided with a light source.

27. A device according to claim 26, wherein the light source is integrated into a cover element.

* * * * *